(12) United States Patent
Farinella et al.

(10) Patent No.: US 7,648,722 B2
(45) Date of Patent: Jan. 19, 2010

(54) COLOR-CHANGING CEREAL AND METHOD

(75) Inventors: Joseph R. Farinella, Chicago, IL (US); Justin A. French, Cedar Rapids, IA (US)

(73) Assignee: The Quaker Oats Company, Chicago, IL (US)

( * ) Notice: Subject to any disclaimer, the term of this patent is extended or adjusted under 35 U.S.C. 154(b) by 686 days.

(21) Appl. No.: 11/274,655

(22) Filed: Nov. 15, 2005

(65) Prior Publication Data
US 2007/0110879 A1 May 17, 2007

(51) Int. Cl.
*A23L 1/10* (2006.01)
*A23L 1/272* (2006.01)

(52) U.S. Cl. .......................... 426/249; 426/93; 426/96; 426/516; 426/618; 426/620

(58) Field of Classification Search .............. 426/618, 426/620, 249, 93, 96, 516
See application file for complete search history.

(56) References Cited

U.S. PATENT DOCUMENTS

| 4,379,171 A | 4/1983 | Furda et al. |
| 4,755,390 A | 7/1988 | Calandro et al. |
| 4,853,235 A | 8/1989 | Tomomatsu |
| 4,925,380 A * | 5/1990 | Meisner ................... 425/131.1 |
| 6,120,821 A | 9/2000 | Goodin et al. |
| 6,270,818 B1 | 8/2001 | Manoski et al. |
| 6,375,995 B1 * | 4/2002 | Glaser ........................ 426/104 |
| 6,495,179 B1 | 12/2002 | Zietlow et al. |
| 6,514,549 B1 | 2/2003 | Hertz et al. |
| 6,610,335 B2 | 8/2003 | Hansa et al. |
| 2005/0003055 A1 | 1/2005 | Baydo et al. |

FOREIGN PATENT DOCUMENTS

| EP | 0826315 A2 * | 4/1998 |
| EP | 1447011 B1 | 8/2004 |

* cited by examiner

*Primary Examiner*—Helen F Pratt
(74) *Attorney, Agent, or Firm*—Banner & Witcoff, Ltd.

(57) ABSTRACT

A ready-to-eat cereal that is capable of changing color upon immersion into an aqueous medium such as milk. The cereal base has a non-dispersible first color. The cereal base has a coating comprising cornstarch, powdered sugar, and optionally food coloring. The coating is of a second color different from the first color and is in a quantity sufficient to obscure the first color. Preferably, glycerine is used to adhere the coating to the cereal base.

Two methods of making the ready-to-eat cereal of the invention are also provided.

12 Claims, No Drawings

COLOR-CHANGING CEREAL AND METHOD

TECHNICAL FIELD

This invention relates to cereals that change color on contact with aqueous liquid such as milk. It also relates to the process to produce such cereals and confections.

BACKGROUND OF THE INVENTION

In the field of ready-to-eat (RTE) cereals, visual attraction is an important factor. It is particularly so in the field of children's food such as breakfast cereal and snacks. Consequently, the cereal industry has been making a great effort to enhance the visual attraction of children's breakfast cereals. Thus, there are many children's breakfast cereals which contain various colored cereals, and cereals that contain some colored pieces, and some cereals containing various amounts of colored confections such as dried marshmallows in various shapes, etc.

One approach to engage the interest of children, as well as other people, in eating RTE cereal would be an RTE cereal that changes color on contact with an aqueous edible medium such as cold milk, hot water, etc. To make the change more interesting, the color change should be rapid and substantial, not merely a diminishing of the original color intensity of the RTE cereal. Thus, there is a need for a cereal that quickly changes from a first color to a second, different color after contact with milk.

In view of the foregoing, there is a need for a color-changing cereal which changes from one color to another color on contact with an aqueous edible medium where neither the base cereal nor the outer coating colors are white.

There is also a need for a method for making color-changing cereals that is efficient and cost effective.

SUMMARY OF THE INVENTION

In accordance with the invention, a color-changing, ready-to-eat cereal and the method of making it are provided. In accordance with the present invention, a base cereal of a first color has an outer dispersible colored coating thereover. Typically, the first color does not disperse in an aqueous medium. The outer coating over the base color has a dispersible second color of a color different from the first color. The outer coating obscures the base or first color. In one embodiment, the coating comprises cornstarch and powdered sugar. If desired, the base color or first color may be a colored coating that is not water or milk dispersible or that is substantially not water or milk dispersible.

Preferably, the coating further comprises a food coloring. Preferably, glycerine is used to bond the coating to the base cereal. Preferably, the first and second colors are not white.

In one embodiment, the outer dispersible coating comprises at least about 55% cornstarch and up to about 45% powdered sugar. Preferably, the coating comprises at least about 65% cornstarch and up to about 35% powdered sugar. More preferably, the coating comprises at least about 75% cornstarch and up to about 25% powdered sugar. Optionally, the coating may comprise a food coloring which may be up to about 5% powdered food coloring and preferably about 0.5% to about 3% powdered food coloring.

Methods of making the inventive ready-to-eat cereal are also provided. In one method, a water soluble binder liquid is atomized. The atomized liquid is applied to a base cereal of a first color. A powder of a second color different from the first color is applied to the wetted cereal to form a powder coating obscuring the first color. Thus, the coating is a particulate coating. The water soluble liquid, which may be glycerin or an aqueous glycerine solution, acts as a binder to bind the powder coating of the second color to the base cereal of the first color.

Preferably, the atomized liquid is applied to the base cereal while the base cereal is falling or is otherwise in motion. Preferably, the base cereal is tumbled or otherwise rotated so that the base cereal is rotating while falling so that substantially all of the surface of the base cereal can be substantially wetted with the liquid.

In a preferred embodiment, the powder comprises from about 55% to about 85% cornstarch, from about 15% to about 45% powdered sugar and optionally up to about 5% powdered food coloring. Most preferably, the coating comprises from about 65% to about 75% cornstarch, from about 15% to about 35% powdered sugar and optionally up to about 5% powdered food coloring.

Preferably, the powder is applied in a twin-screw conveyor.

In accordance with another method of the invention, an RTE color-changing cereal is made by first applying a liquid, which is soluble in water, to a base cereal. The liquid is applied in the inlet half of a drum enrober, more preferably within the inlet third of the enrober. Most preferably, the liquid is applied at or near the inlet end of the drum enrober.

A powder is applied to the wetted base cereal to form a particulate coating on the wetted base cereal that obscures the first color (base color) and forms a particulate coating of a second color over the base cereal. Preferably the powder is applied in the middle third of the enrober.

DETAILED DESCRIPTION OF THE INVENTION

The art of making ready-to-eat cereals is well established and well known throughout the world. The ready-to-eat cereal pieces used as the base material in accordance with the present invention can be made by any of the well-known methods for making RTE cereals whether they be methods involving flaking, rolling, extruding, or "shooting" cereal grains from puffing guns.

In accordance with the present invention, the base piece is colored by any conventional means using color solutions and the like. For example, a red color can be provided by FD&C red #40, green can be provided by fast emerald green shade, a mix of FD&C blue #1 and FD&C yellow #5, and yellow can be provided by FD&C yellow #5 powder.

Cereal pieces which have been extruded or otherwise made from doughs having the color material incorporated into the dough prior to shaping are the preferred base or substrate for use in accordance with the present invention. Also, the cereal pieces can be coated on the surface with a food coloring and glazed with an oil applied over the food coloring to seal the coloring so that the color of the base is not readily dispersible, such as in water or milk.

Many ready-to-eat cereals produced these days involve high speed cooker-extrusion under expansion conditions.

In accordance with the preferred embodiments of the present invention, the ready-to-eat cereal base piece, for example, an expanded extruded cereal dough, is dried to a moisture level below about 10%, and is "glazed" with a solution of syrup or fat to reduce the porosity and to increase the flavor and bowl life. Such a glazing of the base piece is entirely conventional although the use of glazed pieces as the base in accordance with the present invention is a preferred aspect thereof.

A water soluble liquid is then applied to the glazed or unglazed cereal base piece. When glazed base pieces are used, a liquid, which does not tend to dry out, such as glycerine or an aqueous glycerine solution in an amount between 0.5% and 10% can be used based on the weight of the glycerine coated piece. Preferably from about 3% to about 7% glycerine is used. Glycerine is also known as glycerol.

In one preferred method of making the color-changing cereal pieces, the liquid is sprayed on a tumbling bed of the cereal base pieces in an enrober. The spraying occurs within the inlet third of the enrober, preferably at or near the inlet. The glycerine coated pieces are then enrobed with an edible opaque powder. The powder is introduced in the middle third of the enrober, preferably at or near the center of the enrober to allow sufficient time for coating. The powder is adhered to the individual pieces by the previously applied liquid, e.g. glycerine, and the addition of the powder is continued until there is sufficient powder adhering to the pieces to obscure or hide the color of the base piece.

The primary advantage of using one enrober to apply both liquid and powdered coatings is the elimination of a second piece of coating equipment. The elimination of the second enrober decreases the amount of floor space needed for manufacturing, allowing more flexibility and freeing up space for other processes. Using only a single enrober also decreases capital costs and allows for easier clean-up at the plant.

In another preferred method of making the color-changing cereal pieces, rotation or a tumbling action is imparted to cereal pieces as the cereal pieces fall. While falling, the liquid is atomized and applied to the falling, rotating cereal pieces. Preferably, the liquid is atomized and applied by means of a rapidly rotating disk. Preferably, the rate of rotation or tumbling of the falling cereal pieces is sufficient that substantially all of the surfaces of the base cereal pieces are wetted. Most preferably, Mistcoater technology is used to impart spin to the cereal pieces and to coat the cereal pieces with the liquid.

The wetted cereal pieces drop into a twin-screw mixer conveyor. Powder is applied to the wetted cereal pieces in the twin-screw mixer conveyor. This method is very advantageous because balls of liquid and coating do not form. This eliminates the need for machinery for removal of the balls of liquid and coating. In the enrober production method, balls of cereal fines, glycerin and powder are formed due to the constant rolling action of the particles in the enrober. Any small agglomerate of cereal fines, glycerin and powder will begin to tumble along the walls of the enrober. As it tumbles, the excess powder which naturally adheres to the walls of the enrober during processing, begins to adhere to the tumbling agglomerate. Over time, this "snowballing" effect will increase the size of these unwanted particles. These particles pose many issues in processing because their size is highly variable. Removal is exceptionally difficult since these agglomerates are often the same size and shape as the cereal pieces themselves. Given the variability in size and shape, the unwanted particles must be removed based on density, which can be a more difficult and more expensive sorting method.

The twin-screw mixer conveyor processing method eliminates the unwanted powder agglomerates by eliminating the powder buildup and the tumbling action which produce the "snowballing" effect. This method is highly advantageous as it eliminates the need for additional costly sorting equipment and reduces risk of consumer complaints caused by the unwanted particles.

In one embodiment, the coating comprises cornstarch and powdered sugar. Preferably, the coating comprises at least about 55% cornstarch and up to about 45% powdered sugar. More preferably, the coating comprises at least about 65% cornstarch and up to about 35% powdered sugar. Most preferably, the coating comprises at least about 75% cornstarch and up to about 25% powdered sugar. Optionally, the coating may comprise up to about 5% powdered food coloring and preferably about 0.5% to about 3% food coloring. Preferably the powdered sugar is "12×" confectioners sugar.

Surprisingly, the use of cornstarch in the correct ratio to powdered sugar increases the speed of the color change. This creates a more startling effect that is appealing to children. Without wishing to be bound by theory, it appears that the change is driven by the lack of solubility of the corn starch into the glycerin medium. Prior to the invention, it was believed that a high powdered sugar percentage would be advantageous due to sugar's higher degree of solubility in milk (or other aqueous media used to initiate the color change). Initial work using a higher percentage powdered sugar formula (roughly 75%) yielded a color change within 25 seconds of applying milk (with agitation). The higher cornstarch formula (roughly 75% or more) yielded a color change under similar conditions within 7-10 seconds.

The powdered coating is approximately 20 wt % to approximately 30 wt % of the powder coated cereal of the invention. The base cereal is approximately 63 wt % to approximately 77 wt % of the powder coated cereal of the invention. The glycerine coating is approximately 3 to approximately 7 wt % of the powder coated cereal of the invention.

The resulting color-changing pieces can be used in bulk, or mixed sparingly in cereals having, for example, a bland uninteresting color or colors. Upon mixing milk with the resulting cereal, the edible powdered surface is instantly dissolved or dispersed, revealing the specific colors of the individual pieces very quickly.

EXAMPLES

As in the examples hereinafter, all parts are in parts by weight, based on the weight of the material being referred to. The following examples illustrate and explain the present invention, but are not to be taken as limiting the present invention in any regard.

Various different powder coating compositions were tested to see how quickly the color changed. Results are summarized in the table below.

| Powder coating Composition | | | |
| --- | --- | --- | --- |
| Sugar (Parts by Weight) | Starch (Parts by Weight) | Color (Parts by Weight) | Time to complete color change (sec) |
| 85 | 14 | 1 | 25 |
| 34 | 65 | 1 | 15 |
| 24 | 75 | 1 | 10 |
|  | 99 | 1 | 7 |

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A ready-to-eat cereal, capable of changing color upon immersion in an aqueous medium, comprising:
    a base cereal having a surface of a first color that does not disperse in the aqueous medium;

an aqueous medium dispersible color coating of a second color different from the first color and adhered to the base cereal in a quantity sufficient to obscure the first color comprising cornstarch and powdered sugar, wherein the coating comprises at least about 75% cornstarch, at most about 25% powdered sugar and optionally up to about 5% powdered food coloring.

2. The cereal of claim 1 wherein the first color and the second color are not white.

3. The cereal of claim 1 further comprising glycerine bonding the coating to the base cereal.

4. A ready-to-eat cereal, capable of changing color upon immersion in an aqueous medium, comprising:

a base cereal having a surface of a first color that does not disperse in the aqueous medium;

an aqueous medium dispersible color coating of a second color different from the first color and adhered to the base cereal in a quantity sufficient to obscure the first color comprising cornstarch, powdered sugar and food coloring, wherein the coating comprises at least about 75% cornstarch, at most about 25% powdered sugar and optionally up to about 5% powdered food coloring; and glycerine bonding the coating to the base cereal.

5. The cereal of claim 4 wherein the first color and the second color are not white.

6. A method of making a ready-to-eat color-changing cereal comprising:

atomizing a liquid soluble in water;

applying the atomized liquid to a base cereal of a first color; and applying a powder of a second color different from the first color to the wetted cereal to form a powder coating obscuring the first color, wherein the powder comprises at least about 75% cornstarch, at most about 25% powdered sugar and optionally up to about 5% powdered food coloring.

7. The method of claim 6 wherein the atomized liquid is applied to the cereal while the base cereal is falling.

8. The method of claim 7 further comprising rotating the base cereal so that it is rotating while falling so that substantially all of the surface of the base cereal is wetted with the liquid before the powder is applied.

9. The method of claim 8 wherein the powder is applied in a twin-screw mixing conveyor.

10. The method of claim 6 wherein substantially no liquid soaked powder balls are formed.

11. A method of making a ready-to-eat color-changing cereal continuously comprising:

applying a liquid soluble in water to a base cereal of a first color in the inlet half of a drum enrober; and applying a powder of a second color different from the first color to the wetted cereal to form a powder coating obscuring the first color, wherein the powder comprises at least about 75% cornstarch, at most about 25% powdered sugar and optionally up to about 5% powdered food coloring.

12. The method of claim 11 wherein the liquid is applied within the inlet third of the enrober and the powder is applied within the middle third of the enrober.

* * * * *

UNITED STATES PATENT AND TRADEMARK OFFICE
CERTIFICATE OF CORRECTION

PATENT NO.       : 7,648,722 B2
APPLICATION NO.  : 11/274655
DATED            : January 19, 2010
INVENTOR(S)      : Farinella et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

Signed and Sealed this

Twenty-third Day of November, 2010

David J. Kappos
*Director of the United States Patent and Trademark Office*